United States Patent
Keller et al.

(10) Patent No.: US 12,204,435 B2
(45) Date of Patent: Jan. 21, 2025

(54) REMOTE VALIDATION FOR REGULATED ENVIRONMENTS

(71) Applicant: Minitab, LLC, State College, PA (US)

(72) Inventors: Dawn Elaine Keller, State College, PA (US); Martin Dean Johnson, State College, PA (US); Jeremy C. Zerbe, Huntingdon, PA (US); Duane Long, Philipsburg, PA (US); Michael J. Yeaney, Clarence, PA (US)

( * ) Notice: Subject to any disclaimer, the term of this patent is extended or adjusted under 35 U.S.C. 154(b) by 244 days.

(21) Appl. No.: 17/902,713

(22) Filed: Sep. 2, 2022

(65) Prior Publication Data

US 2024/0078167 A1 Mar. 7, 2024

(51) Int. Cl.
*G06F 11/36* (2006.01)

(52) U.S. Cl.
CPC ...... *G06F 11/3608* (2013.01); *G06F 11/3688* (2013.01)

(58) Field of Classification Search
CPC ............ G06F 11/3668; G06F 11/3616; G06F 11/3608; G06F 11/3672; G06F 11/3696
See application file for complete search history.

(56) References Cited

U.S. PATENT DOCUMENTS

| | | | |
|---|---|---|---|
| 2004/0049362 A1* | 3/2004 | Volkov | G06F 11/3688 714/E11.21 |
| 2008/0209270 A1* | 8/2008 | Alladi | G06F 11/2294 714/30 |
| 2010/0235824 A1* | 9/2010 | Sabet | G06F 11/1433 717/171 |
| 2013/0167250 A1* | 6/2013 | Balasubramanian | H04L 63/00 726/28 |
| 2017/0372247 A1* | 12/2017 | Tauber | G06F 8/71 |
| 2020/0012779 A1* | 1/2020 | Chandrasekaran | G06F 21/64 |
| 2020/0117564 A1* | 4/2020 | Wu | G06F 11/2635 |
| 2020/0350069 A1* | 11/2020 | Holmquist | H04L 43/0894 |
| 2022/0050766 A1* | 2/2022 | Tate | G06F 11/3608 |
| 2022/0206929 A1* | 6/2022 | Rao | G06F 11/3688 |
| 2022/0284100 A1* | 9/2022 | Simon | G06F 8/61 |

* cited by examiner

*Primary Examiner* — Wei Y Zhen
*Assistant Examiner* — Amir Soltanzadeh
(74) *Attorney, Agent, or Firm* — Kofi Aninakwa

(57) ABSTRACT

A method of validating a regulated application by generating, on a local data processing system, an automated agent to oversee a validation process of the regulated application on the local data processing system regardless of a local or web-based nature of the regulated application.

22 Claims, 9 Drawing Sheets

REMOTE VALIDATION FOR REGULATED ENVIRONMENTS

TECHNICAL FIELD

The present invention relates generally to a method, system, and computer program product for validating software. More particularly, the present invention relates to a method, system, and computer program product for remote continuous validation of applications for regulated environments.

BACKGROUND

Unit tests and other automated scripts may be conducted to validate the results of a software process. Usually said tests have a visual component which is typically manually verified through a visual check against previously captured images of the visual component. A downside of this is human error and an excessive time requirement for said check.

SUMMARY

The illustrative embodiments provide a method, system, and computer program product for validating applications. In one aspect, a method is disclosed. The method may include the steps of validating an application by generating an automated agent as a target application configured to oversee a validation process of the first application on a local data processing system. The method may include establishing a channel between the agent and a validation module located on a remote data processing system, said channel being established for validating said first application. The method may include providing to the agent, by the validation module, startup and test parameters for the validation process, starting up, by the agent, the first application based on said startup parameters and executing, by the agent, responsive to the starting up, a predefined test based on said test parameters. The method may include capturing an output of the test and comparing said output to a stored desired result to obtain a quality metric about the application. The method may also include continuously validating the application based on a repeat criterion being met.

An embodiment may include a computer usable program product. The computer usable program product may include a computer-readable storage device, and program instructions may be stored on the storage device.

In an embodiment, the program instructions may be stored in a non-transitory computer readable storage medium in a data processing system, and computer usable code may be transferred over a network from a remote data processing system. In an embodiment, the program instructions are stored in a computer readable storage device in a server data processing system, and the computer usable code is downloaded over a network to a remote data processing system for use in a computer readable storage device associated with the remote data processing system.

An embodiment may include a computer system. The computer system includes at least one processor configured to performs the steps of validating an application.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
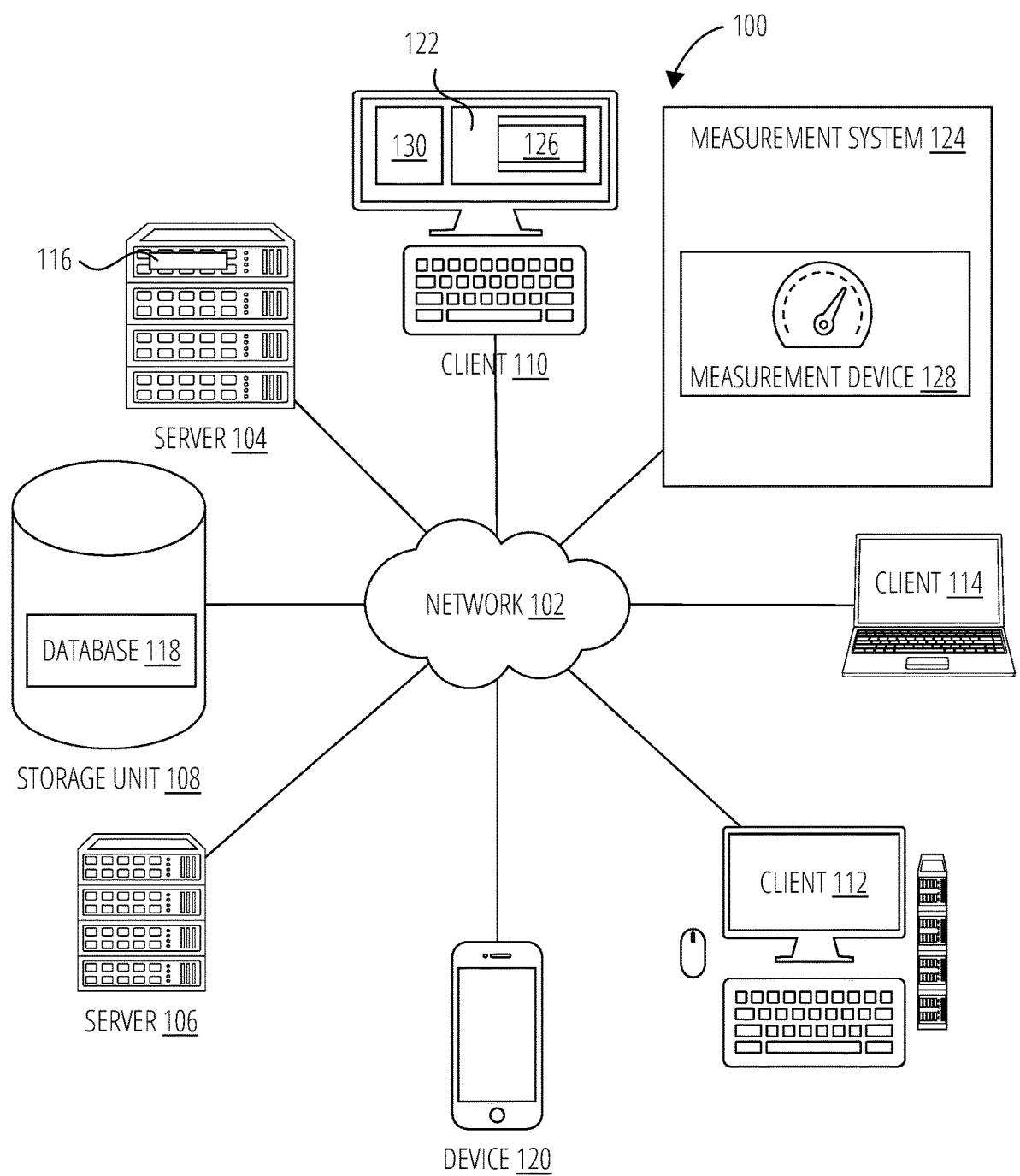
FIG. 1 depicts a block diagram of a network of data processing systems in which illustrative embodiments may be implemented.

The illustrative embodiments recognize that there may be a need for regulated industries to ensure the accuracy of software functionality throughout its lifetime. For example, predictive analytics or statistical and graphical analytic platforms used in regulated industries may reside in regulated environments that require verification and validation of software applications and functionality frequently. Verification may determine a quality measure of the software. Verification may include activities associated with producing high quality software, i.e.: testing, inspection, design analysis, specification analysis, etc. Verification may be a relatively objective process, in that if the various processes and documents are expressed precisely enough, no subjective judgement may be needed in order to verify software. Validation, on the other hand, may involve a process in which requirements of a user may be determined to be met by the software functionality. Validation may be performed at the end of a development process and may take place after verifications are completed. The illustrative embodiments recognize that these steps may be performed as changes are made to software code base to ensure "breakage" does not occur in one area or another, as a result of said code changes.

The illustrative embodiments further recognize, however, that some practical applications may require verification and validation to be strictly performed in a regulated environment (computer system on which a user of the software uses the software) and to do so before any updates to the software. This may present enormous challenges especially as software applications progressively adopt a cloud architecture which may be updated without user input or control. While statistical and graphical results produced by software applications such as statistical software applications, may sometimes be verified using predetermined results for comparisons, they may also be verified user level based on "atomic"/internal results (verifying the results through numeric/textual values used to create the visual graphical representations on a screen, e.g. JSON (JavaScript Object Notation), html, xml), wherein the actual results provided to the user (and captured on a system of the user) rather than predetermined comparisons are used. Further, typical validation results may comprise several tens or hundreds of pages. Hitherto, a visual/graphical representation of test results may typically be validated through a manual/structural "walk-through" or a visual check against previously captured images. Such a manner of validation is error-prone, time consuming and costly particularly if tests have to be repeated frequently. Comparison tools may also capture small inconsequential updates that essentially amount to false positives. Further, such a manner of validations may be especially prohibitive for applications involving sensitive data, such as the testing of medical devices and medical data wherein false validations may be misleading and even damaging. The illustrative embodiments recognize that providing a means for validating applications repeatedly and automatically, responsive to software changes, and even in a context-aware manner where insignificant changes are ignored, has been a significant and complex pain-point in the industry which has hitherto been unresolved with any viable systems and processes let alone systems and processes that are applicable for validation on an actual local computer system of the user of the application regardless of a local or cloud based architecture of the application. Herein, local computer may refer to the actual machine the application is running on. More specifically, for a desktop solution, for example, the results may be different because of the processor used. When Company A changes it's chip from an Intel (a registered trademark of Intel Corporation) chip to an Apple M1 (a registered trademark of Apple Inc.) chip, users may observe different results on the based on the chip used. For cloud based products, depending on the configuration, if portions thereof are still run locally, similar problems may occur.

In an illustration, a manufacturing process of a product such as a medical device/product, or a healthcare clinical trial process may be validated through associated software. For example, a vaccine manufacturer may be required to ensure that the fill weight of a vaccine syringe remains stable over time to ensure the right dosage is available. The manufacturer may thus use an application, in a process behavior analysis, to monitor the proportion of nonconforming units in a sample. For, example, there may be a first regulatory requirement that a defined proportion of weight measurements fall within a defined range about a target fill weight. However, there may also be a second regulatory requirement that the ability of the application to correctly monitor the first regulatory requirement remains unchanged at all times. Thus, not only is the process behavior regulated, the environment of the application used to monitor process behavior may also be regulated. This may however be complicated when scaling up applications to a wider network, e.g. when adopting a cloud infrastructure wherein applications may have to be controlled remotely while still testing locally. In another example, there may be a first regulatory requirement that intravenous (IV) devices produced in a manufacturing location are capable of delivering the right amount of fluid, which amount falls within an upper and lower specification. An application may thus be used, in a capability analysis, to determine how well the process meets the specification limits, based on a sample of data taken from the process. The larger the index of process performance measure, the less the variations between the process output and the specifications. However, there may also be a second regulatory requirement that the ability of the application to correctly assess the first regulatory requirement remains effective at all times. Thus, not only is the process capability regulated, the environment of the application used to monitor process capability may also be regulated. In another example, an application may be used by a manufacturer in an attribute agreement analyses to assess the agreement between the ratings made by appraisers and the known standards. The application may thus evaluate the agreement of subjective nominal ratings or subjective ordinal ratings by multiple appraisers and to determine how likely a measurement system is to misclassify a part. It may be worthwhile to ensure that the application analyzing the attribute agreement remains effective at all times.

However, updates to the application code may have associated errors which when uncorrected may provide false results. Further there may be frequent updates to the application thus requiring frequent validations. Even further, regulatory organizations tasked for ensuring safety and efficacy of products may have specific requirements for manufacturing processes, including for example, ensuring that the functionality of applications are validated on regulated/regulatory environment (computer system) of the user, which requirements may have to be met at all times. By methods and systems described herein, the application may be validated responsive to updates or requests to ensure the continued reliability of the application throughout its lifetime.

A method of an embodiment described herein, when implemented to execute on a device or data processing system, comprises substantial advancement of the functionality of that device or data processing system for remote validation for regulated environments. For example, prior-art method of regulated validation requires manual validation by a user using a regulated environment, and also requires highly specialized skill and knowledge of the systems being validated. It may also require holding off new software released by a provider from internal distribution by an administrator or user until the manual testing of the new software release by said administrator or user. An embodiment automates a process of remotely and automatically validating applications in regulated environments, and understanding the customized testing requirements of individual users, transforms based on a validation service, a user's testing data into a data output of the service, and configures a suitable manner of forwarding the service outputs to the appropriate agents in the user's environment. Such manner of scalable software versioning/control flow in regulated environments using automated validation services is unavailable in presently available devices or data processing systems. Thus, a substantial advancement of such devices or data processing systems by executing a method of an embodiment is obtained by reducing the time and effort of integrating new applications and new users, reducing the level of skill and knowledge needed for the integration, making available validation, especially regulated validation to a myriad of data processing systems, improvement in the re-usability and reproducibility of the validation services, and improved scalability for future systems evolution. An embodiment may, upon installation, cause an agent to establishes a 2-way communication channel with a validation service and await commands. When a test is initiated by an operator, the agent may be notified over this communication channel and may receive the test script to run as well as information about the application to run. The agent may start the specified application and begin executing the test script. All output results may be captured and pushed back to the validation service for comparison to specified test oracles for correctness. Another embodiment may enable validating in a context aware manner wherein specific changes to code may be validated wherein other changes such as like color changes may not be validated. For example, a trained machine learning (ML) or natural language processing (NPL) engine may be utilized to compute a context of changes based on an input corpus of change information.

An embodiment can be implemented as a software and/or hardware application. The application implementing an embodiment can be configured as a modification of an existing system, as a separate application that operates in conjunction with an existing system, a standalone application, or some combination thereof.

Particularly, some illustrative embodiments provide a method that may validate an application by generating, on a local data processing system, an agent as a target application configured to oversee a validation process of the application on the local data processing system. A channel may be established between the agent and a validation module located on a remote data processing system and the validation module may provide to the agent startup and test parameters for the validation process. The test may be executed, and results captured for comparison to the predetermined result to obtain a quality metric about the application.

In another embodiment, the application is a regulated desktop application located on the local data processing system. In another embodiment, the application is a regulated web application hosted by the remote data processing system on the local data processing system. Other technical features may be readily apparent to one skilled in the art from the following figures, descriptions, and claims.

This manner of automatically and continuously validating applications in regulated environments is unavailable in the presently available methods in the technological field of endeavor pertaining to regulated industries and their statistical and predictive analytical platforms. A method of an embodiment described herein, when implemented to execute on a device or data processing system, comprises substantial advancement of the computational functionality of that device or data processing system in configuring the performance of a regulated platform.

The illustrative embodiments are described with respect to certain types of machines configured for testing based on predefined testing parameters. The illustrative embodiments are also described with respect to other scenes, subjects, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific surveys, code, hardware, algorithms, designs, architectures, protocols, layouts, schematics, and tools only as examples and are not limiting to the illustrative embodiments. Furthermore, the illustrative embodiments are described in some instances using particular software, tools, and data processing assembly only as an example for the clarity of the description. The illustrative embodiments may be used in conjunction with other comparable or similarly purposed structures, systems, applications, or architectures. For example, other comparable devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

With reference to the figures and in particular with reference to FIG. 1, a data processing assembly 100 in which illustrative embodiments may be implemented. FIG. 1 is only an example and is not intended to assert or imply any limitation with regard to the assemblies in which different embodiments may be implemented. A particular implementation may make many modifications to the depicted assemblies based on the following description.

FIG. 1 depicts a block diagram of a network of data processing systems in which illustrative embodiments may be implemented. Data processing assembly 100 is a network of computers in which the illustrative embodiments may be implemented. Data processing assembly 100 includes network 102. Network 102 is the medium used to provide communications links between various devices and computers connected together within data processing assembly 100. Network 102 may include connections, TCP/IP, wireless communication links, wires, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing assembly 100. Client 110, client 112, client 114 are also coupled to network 102. A data processing system, such as server 104 or server 106, or clients (client 110, client 112, client 114) may contain data and may have software applications or software tools executing thereon. Server 104 may include one or more GPUs (graphics processing units) for training one or more models.

Only as an example, and without implying any limitation to such architecture, FIG. 1 depicts certain components that are usable in an example implementation of an embodiment. For example, servers and clients are only examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems (server 104, server 106, client 110, client 112, client 114) also represent example nodes in a cluster, partitions, and other configurations suitable for implementing an embodiment.

Device 120 is an example of a device described herein. For example, device 120 can take the form of a smartphone, a tablet computer, a laptop computer, client 110 in a stationary or a portable form, or any other suitable device. A software application described as executing in another data processing system in FIG. 1 may be configured to execute in device 120 in a similar manner. Any data or information stored or produced in another data processing system in FIG. 1 may be configured to be stored or produced in device 120 in a similar manner.

Test engine 126 may execute tests on application under test 130 as part of the validation processes of client validation application 122 which may be at least partially controlled by cloud or server validation application 116. Test engine 126 may also execute as a cloud service communicatively coupled to system services, hardware resources, or software elements described herein. Database 118 of storage unit 108 stores one or more measurements or data in repositories for computations herein.

Server validation application 116 may implement an embodiment described herein. Server validation application 116 may use data from storage unit 108 for validation services. Server validation application 116 may also obtain data from any client for validation services. Server validation application 116 may also execute at least partially in any of data processing systems (e.g., server 104 or server 106, client 110, client 112, client 114), such as client validation application 122 or a web client in client 110 to test the application under test 130 and need not execute in the same system as server 104.

Server 104, server 106, storage unit 108, client 110, client 112, client 114, device 120 may couple to network 102 using wired connections, wireless communication protocols, or other suitable data connectivity. Client 110, client 112 and client 114 may be, for example, personal computers or network computers.

In the depicted example, server 104 may provide data, such as boot files, operating system images, and applications to client 110, client 112, and client 114. Client 110, client 112 and client 114 may be clients to server 104 in this example. Client 110, client 112 and client 114 or some combination thereof, may include their own data, boot files, operating system images, and applications. Data processing assembly 100 may include additional servers, clients, and other devices that are not shown. Server 104 includes the server validation application 116 that may be configured to implement one or more of the functions described herein for testing in accordance with one or more embodiments.

The data processing assembly 100 may include a dedicated measurement system 124 which may also comprise a test engine 126. The dedicated measurement system 124 may be used for performing measurement processes such as clinical trials or measurements of defined properties in a regulated industry, via special purpose measurement devices 128 such as medical devices, vision and imaging devices, detectors, transducers, sensors instruments used in measuring physical, chemical or biological quantities and attributes of real-world objects and events. The dedicated measurement system 124 may also make use of the test engine 126 to test samples to ensure a continuously validated software in a regulatory environment (computer system on which a user of the software uses the software). The measurement system 124 may make inquiries about the validation status of a software in the regulatory environment prior to performing measurement activities. For example, prior to applying an Anderson-Darling test to the measurements, it may obtain information about the reliability of a corresponding application/software and thus of a regulatory environment of the measurement system 124. An operator of the measurement system 124 can include individuals, computer applications, and electronic devices.

The data processing assembly 100 may also be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing assembly 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing assembly 100 may be used for implementing a client-server architecture in which the illustrative embodiments may be implemented. A client-server architecture enables software applications and data to be distributed across a network such that an application functions by using the interactivity between a client data processing system and a server data processing system. Data processing assembly 100 may also employ a service-oriented architecture where interoperable software components distributed across a network may be packaged together as coherent business applications. Data processing assembly 100 may also take the form of a cloud and employ a cloud computing model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Figure 2:
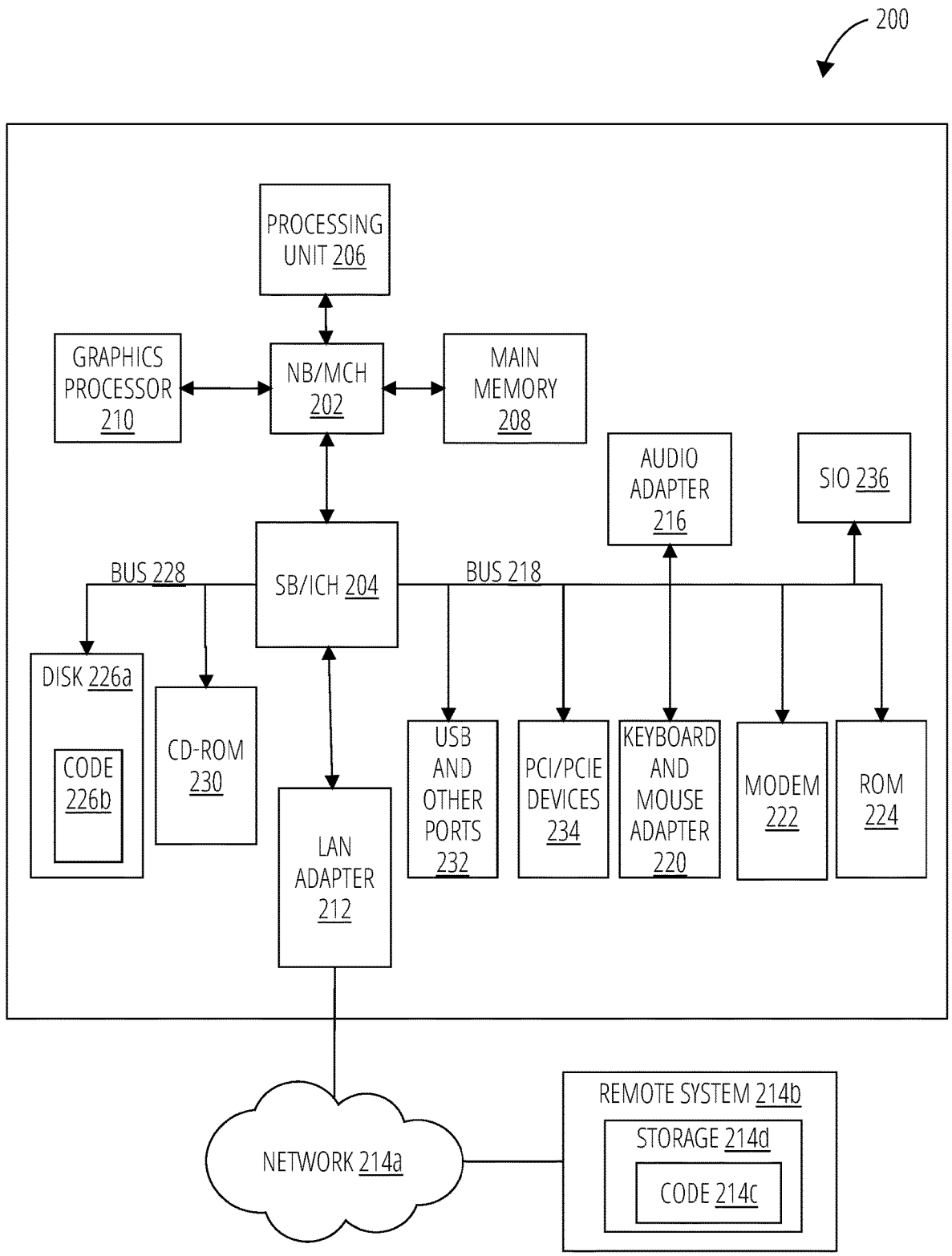
FIG. 2 depicts a block diagram of a data processing system in which illustrative embodiments may be implemented.

With reference to FIG. 2, this figure depicts a block diagram of a data processing system in which illustrative embodiments may be implemented. Data processing system 200 is an example of a computer, such as server 104, server 106, or client 110, client 112, client 114, measurement system 124 in FIG. 1, or another type of device in which computer usable program code or instructions implementing the processes may be located for the illustrative embodiments.

Data processing system 200 may also be representative of a data processing system or a configuration therein, such as device 120 in FIG. 1 in which computer usable program code or instructions implementing the processes of the illustrative embodiments may be located. Data processing system 200 is described as a computer only as an example, without being limited thereto. Implementations in the form of other devices, such as device 120 in FIG. 4, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to North Bridge and memory controller hub (NB/MCH) 202 through an accelerated graphics port (AGP) in certain implementations.

In the depicted example, local area network (LAN) adapter 212 is coupled to South Bridge and input/output (I/O) controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and input/output (I/O) controller hub (SB/ICH) 204 through bus 218. Hard disk drive (HDD) or solid-state drive (SSD) 226a and CD-ROM 230 are coupled to South Bridge and input/output (I/O) controller hub (SB/ICH) 204 through bus 228. PCI/PCIe devices 234 may include, for example, Ethernet adapters, add-in cards, and PC cards for notebook computers. PCI uses a card bus controller, while PCIe does not. Read only memory (ROM) 224 may be, for example, a flash binary input/output system (BIOS). Hard disk drive (HDD) or solid-state drive (SSD) 226a and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and input/output (I/O) controller hub (SB/ICH) 204 through bus 218.

Memories, such as main memory 208, read only memory (ROM) 224, or flash memory (not shown), are some examples of computer usable storage devices. Hard disk drive (HDD) or solid-state drive (SSD) 226a, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as server validation application 116 and client validation application 122 in FIG. 1, are located on storage devices, such as in the form of codes 226b on Hard disk drive (HDD) or solid-state drive (SSD) 226a, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory (ROM) 224, or in one or more peripheral devices.

Furthermore, in one case, code 226b may be downloaded over network 214a from remote system 214b, where similar code 214c is stored on a storage device 214d in another case, code 226b may be downloaded over network 214a to remote system 214b, where downloaded code 214c is stored on a storage device 214d.

The hardware in FIG. 1 and FIG. 2 may vary depending on the implementation. Other internal hardware or peripheral devices, such as flash memory, equivalent non-volatile memory, or optical disk drives and the like, may be used in addition to or in place of the hardware depicted in FIG. 1 and FIG. 2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture. In other examples, the data processing system 200 may be a collection of systems in an isolated local assembly that selectively interacts with another collection of other systems in a remote assembly though an interconnecting network.

A communications unit may include one or more devices used to transmit and receive data, such as a modem or a network adapter. A memory may be, for example, main memory 208 or a cache, such as the cache found in North Bridge and memory controller hub (NB/MCH) 202. A processing unit may include one or more processors or CPUs.

The depicted examples in FIG. 1 and FIG. 2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and Hard disk drive (HDD) or solid-state drive (SSD) 226a is manifested as a virtualized instance of all or some portion of Hard disk drive (HDD) or solid-state drive (SSD) 226a that may be available in the host data processing system. The host data processing system in such cases is represented by data processing system 200.

Figure 3:
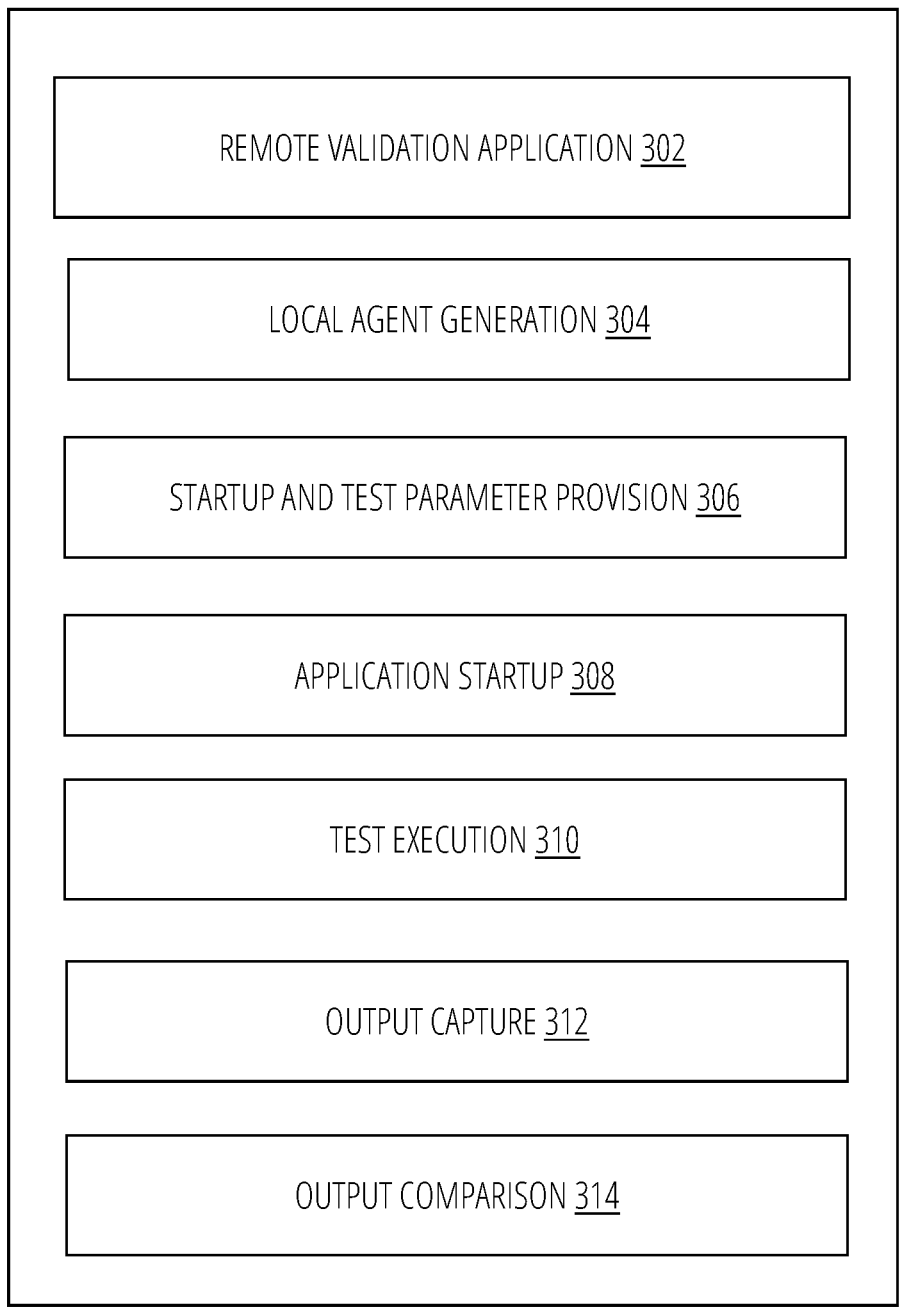
FIG. 3 depicts a block diagram of an application in which illustrative embodiments may be implemented.

With reference to FIG. 3, this figure depicts a block diagram of an example configuration for remote validation of applications in regulated environments. The example embodiment includes remote validation application 302. In a particular embodiment, remote validation application 302 is an example of server validation application 116 of FIG. 1.

Remote validation application 302 located on a remote data processing system may receive a set of startup and test parameters. Startup parameters may include information about a startup process of the application under test 130, for example, an application type to startup and a machine or data processing system 200 on which the application under test 130 resides. Test parameters may include information about a validation process of the application under test 130, including for example, input data to test, a test script, expected output data, and information about a regulatory process or regulated product such as expected graphical, statistical and tabular output, test scripts that encompass necessary options associated with the feature under test, and input data that is representative of an operator's regulatory process or regulated products for which the application is being used etc.

In one aspect, a target application or service (referred to herein as an agent) is generated 304 and configured to oversee a validation process of the regulated desktop or web client application under test 130 on the local data processing system. A secure channel may be established between the agent and the remote validation application 302 or service (validation module) located on the remote data processing system, said channel being established for validating said application under test 130. Further remote validation application 302 may provide said startup and test parameters to the agent for starting up (308), based on the startup parameters, and testing (310), based on the test parameters, the application under test 130.

An output of the test may be captured (312) in a regulatory environment of the user (local data processing system or machine of the user). The captured output may be provided, for example, to the remote validation application 302 for output comparison 314.

Figure 4:
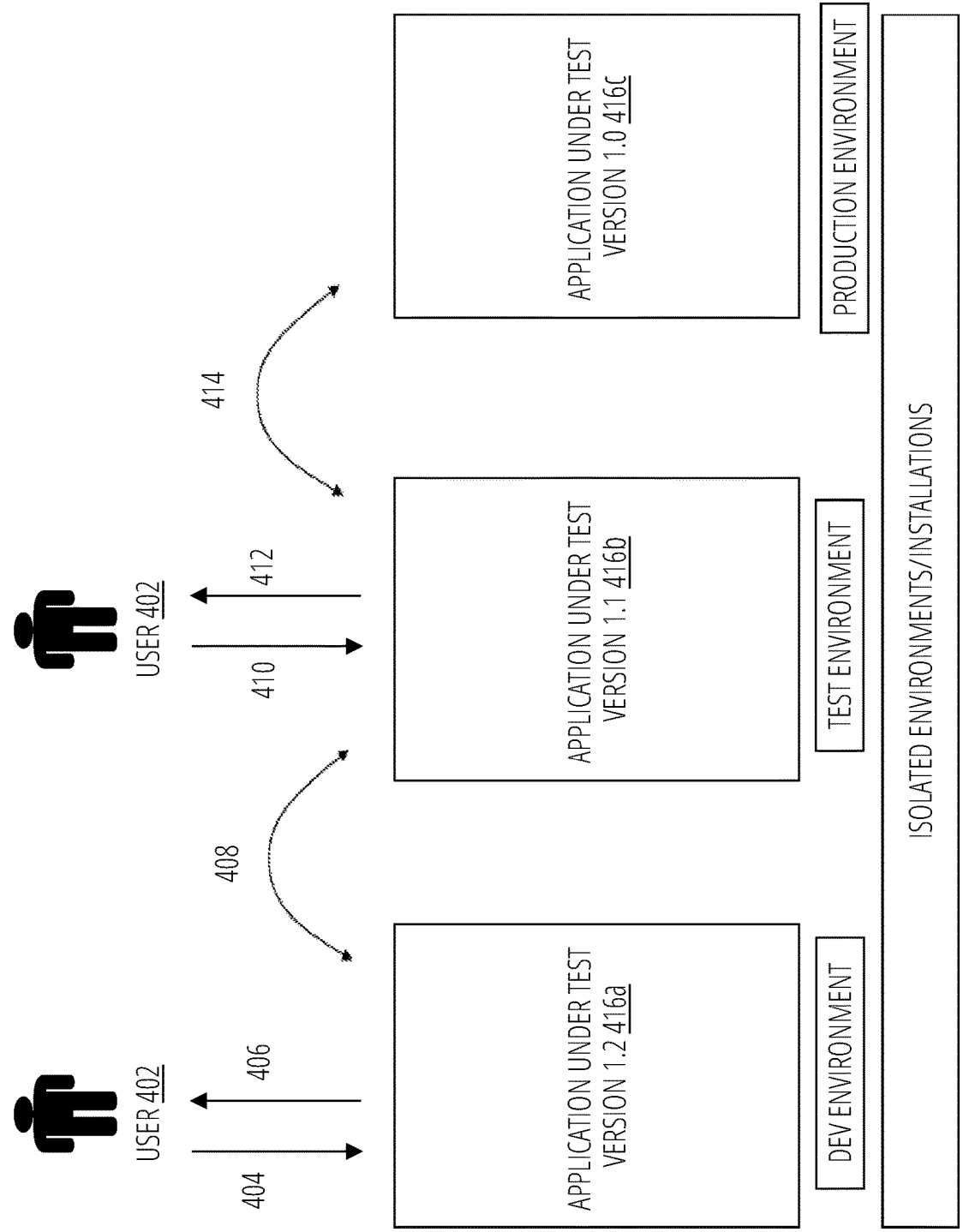
FIG. 4 depicts a block diagram of a standard validation process.

Turning now to FIG. 4, a standard validation process is discussed. The process may include testing in a development environment by a user 402 a new version of a system or application (application under test (Version 1.2) 416a), step 404. This may be performed by issuing commands to interact with the development environment. In step 406, the user 402 may validate results for each step and update related documentation.

After all tests have passed, the user 402 may apply the version to a test environment as application under test (Version 1.1) 416b in step 408 and issue the commands to interact with the test environment in step 410. In step 412, the results for the test environment may be validated and after all testing is done and passing, the new version of the application can be applied to the production environment (application under test (Version 1.0) 416c).

Figure 5:
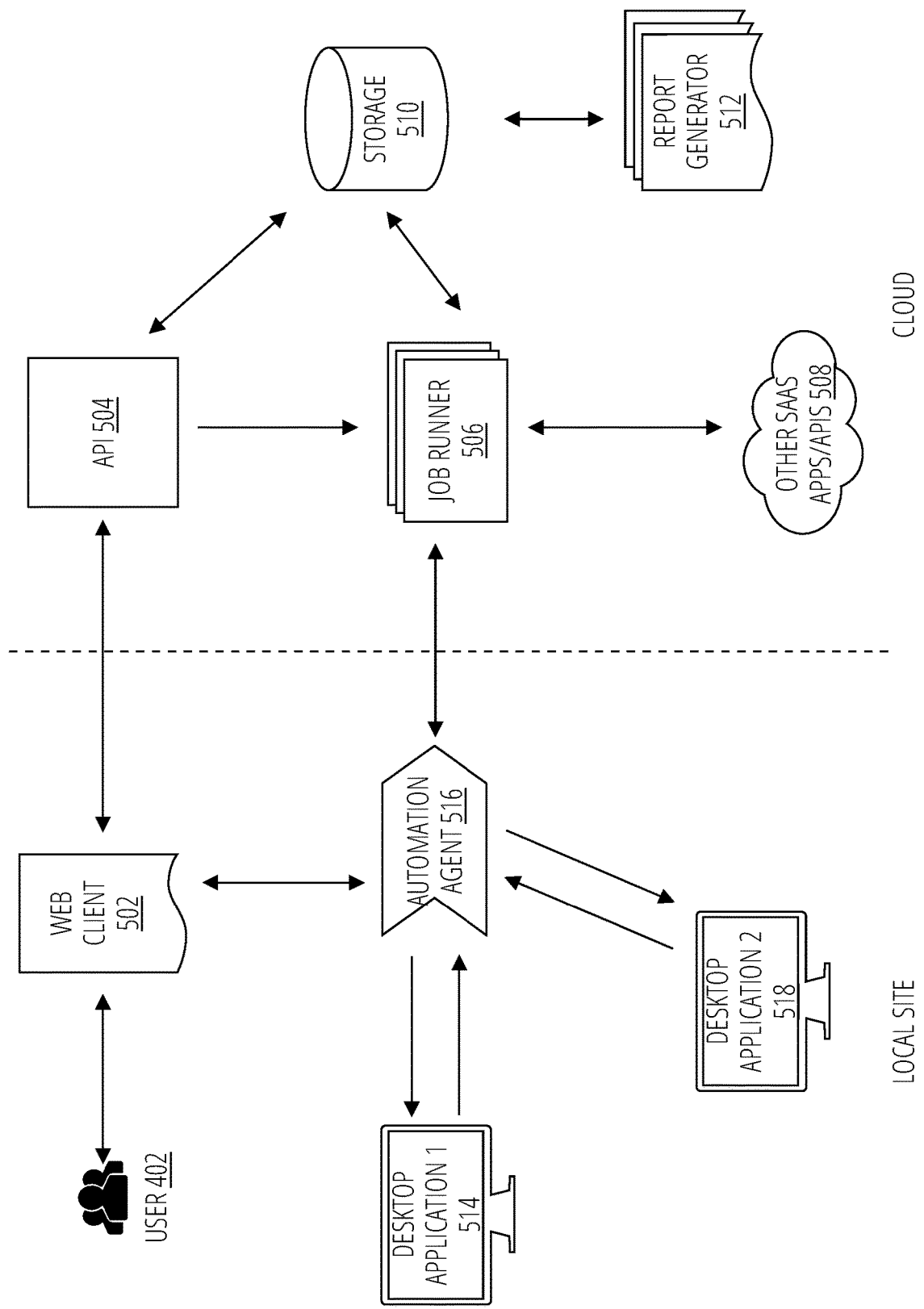
FIG. 5 depicts a flow diagram in which illustrative embodiments may be implemented.
Figure 6:
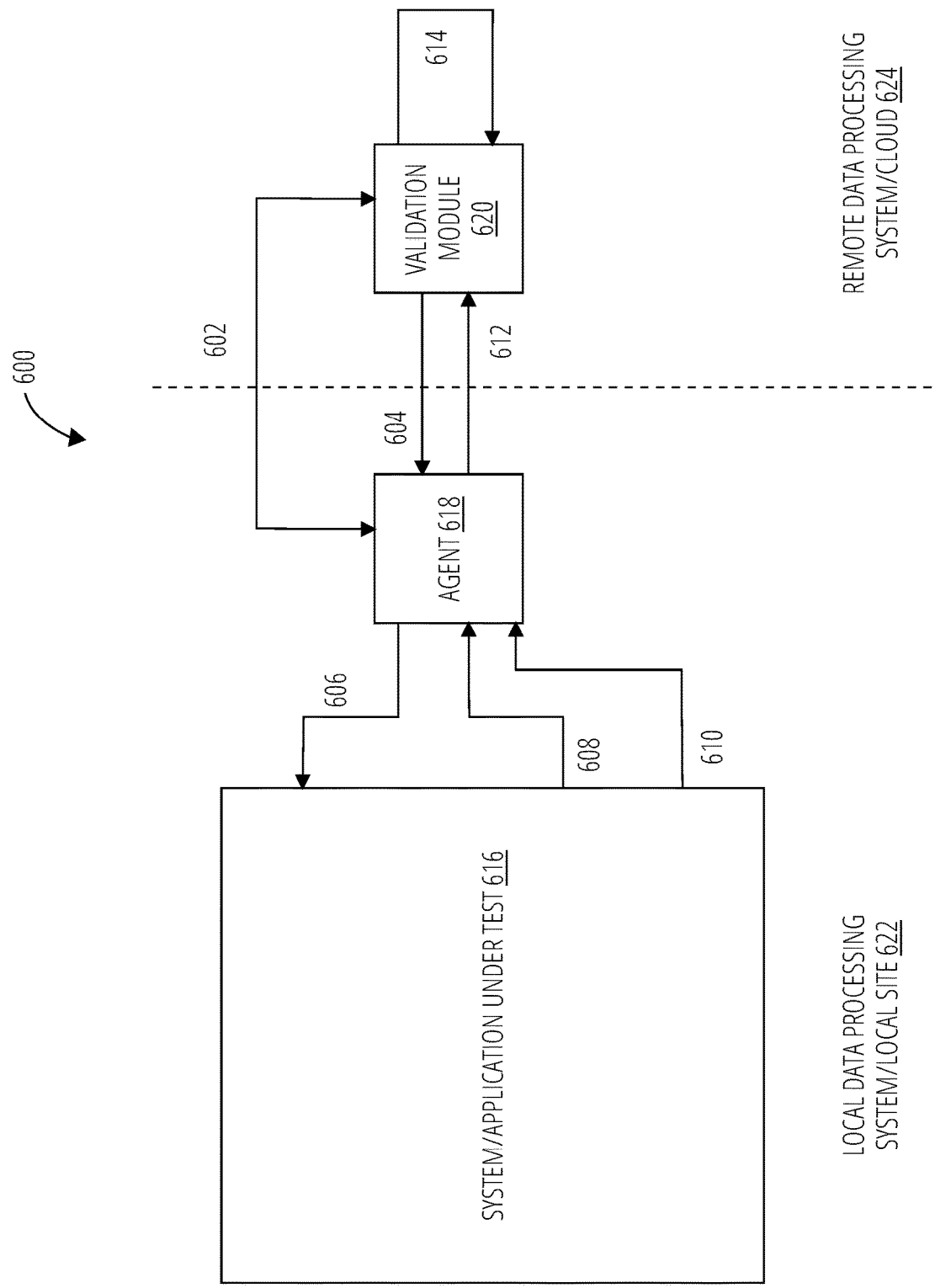
FIG. 6 depicts a regulated desktop application flow diagram in which illustrative embodiments may be implemented.
Figure 7:
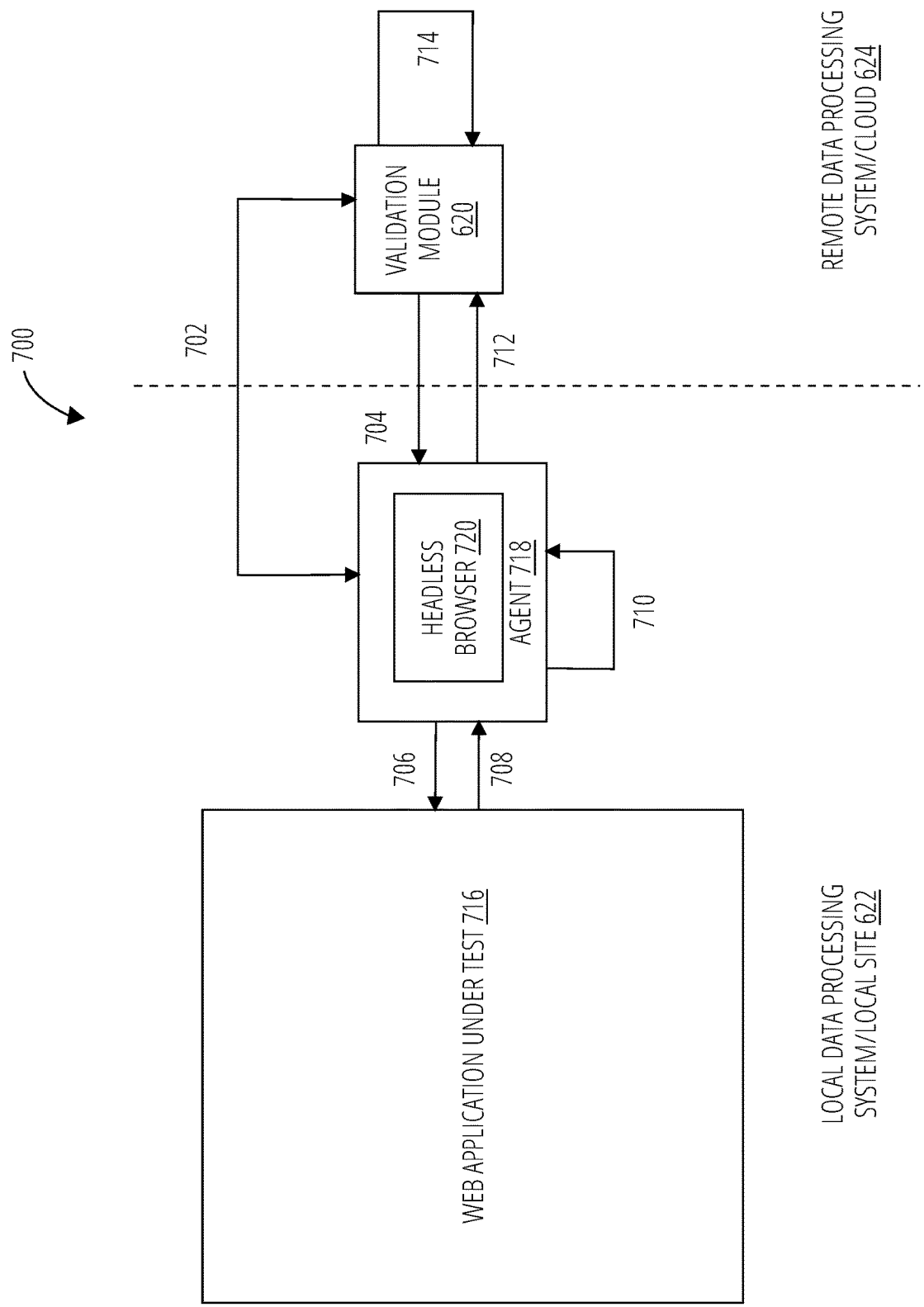
FIG. 7 depicts a regulated web-based application flow diagram in which illustrative embodiments may be implemented.

With reference to FIG. 5-FIG. 7, illustrative embodiments of a remote validation for regulated environments are described. In one aspect, as shown in at least FIG. 5, a regulated web client 502 or desktop application 1 514 may be validated by generating or deploying, at a local site, an automation agent 516 as a target application configured to oversee a validation process of an application under test (regulated web client 502, regulated desktop application 1 514, regulated desktop application 2 518) on the local data processing system. The regulated desktop applications may be program that runs locally on a computer system like a desktop or a laptop whereas the regulated web application may be hosted by a remote cloud via a web client 502 that receives and sends API (application programming interface) calls and thus, may need an internet connection.

To prevent the opening up of firewalls and thus being subjected to network safety risk at the local site, and to remotely controlling the local validation process from a cloud setting, a secure channel between the automation agent 516 and a validation module located on a remote data processing system may be established. The automation agent may be a module that is configured to interact with the application that is being validated in a regulated environment via, for example, command line interface. The automation agent may also be configured to deliver output results to the validation module via an HTTP/REST endpoint. The validation module may provide or comprise one or more job runners 506 as configured as services on the remote data processing system that may communicate with and/or control one or more local automation agents 516 via instructions transferred over a network from the remote data processing system.

The validation module may orchestrate execution of the software in the customer's environment from the cloud. This may be achieved because of the automation agent deploy. This is because from an audited/audited industry point of view, the validation results may be obtained from the user's environment.

Other applications or APIs 508 may be set up to communicate with the job runner 506. Startup and test parameters for the applications under test may be stored remotely on a remote storage 510 and provided to the automation agent 516 when needed. Based on actual test results obtained by the automation agent 516 at the local site and transferred to the storage 510, a report generator 512 may generate a report representative of a comparison between the actual test results and the expected test results. By obtaining the actual test results locally and performing the comparison remotely, software use in regulatory environments may be scaled up quickly when adopting a cloud architecture regardless of a location of a whole or part of the application under test, without compromising the strict validation requirements of said regulatory environments.

The comparison may be performed by the validation module and may provide a quality metric about the application under test which may be, for example, a pass or fail indication, an area of the application or test script producing a fail indication, a graphical overlay of an actual result over an expected result, etc.). In an aspect herein, the comparison may be performed by differencing underlying atomic data (textual representation of a displayed object) including, for example, json, html, and xml data. In an aspect herein, the comparison may optionally comprise a use of an image or textual differencing application configured to automatically compute and display differences between the contents of the output (actual test results) and the stored desired result. (e.g., Textual differences or image differences). In an example, a textual representation of a histogram image result may be captured and used as a textual output for comparison. In another alternative example, a difference between a captured image and a stored image may be computed by finding the difference between each pixel in each image, and generating an image based on the result. Herein, the two images may first be aligned for corresponding points coincide, and their photometric values may be made compatible, by calibration, or post-processing (using color mapping).

To satisfy regulatory requirements, the test execution and the capturing of test results may be performed on the regulatory environment/local data processing system/local site such that the output is obtained for a regulated environment of a user.

In an aspect herein, validation of the application under test may be repeated responsive to a repeat criterion being met. The validation may thus be repeated indefinitely, for example, whenever an update of the application under test 130 is published or at regular time intervals. The repeating may be automatic or may alternatively be initiated by a user.

In a further aspect, the validation module may be configured to validate one or more other applications having different functionalities from said first application, on one or more other corresponding local data processing systems. This may involve configuring the validation module to create various corresponding services once a secure channel is established between the module and local agents, or once changes to the applications under test have been detected.

Said configuring may be initiated locally or remotely based on corresponding startup and test parameters.

In another aspect, the validation module may be configured to validate said the application under test, on one or more other corresponding local data processing systems such that one or more corresponding environment dependent quality metrics about the application under test may obtained in the one or more other corresponding local data processing system. These quality metrics may be compared with the quality to determine that the application under test passes validation in different environments. This may be initiated locally by the user or remotely in said cloud. Of course, the illustrative embodiments are not intended to be limiting as other technical features may be readily apparent to one skilled in the art from the descriptions herein.

With reference to FIG. 6, a regulated desktop application flow diagram 600 is shown. Step 602-step 614 show data flow between the local data processing system 622 and the remote data processing system/cloud 624. In step 602, an automation agent 618 may establish a secure channel with the validation module 620 for information transfer. Encryption keys may be exchanged in the process. Upon initiating a test/validation run, the startup parameters and test parameters may be pushed to the agent 618 in step 604. The agent may start the application 616 and may begin executing, in step 606, the test script obtained from the test parameters. Textual/command output (graphical, tabular and numerical outputs) may be automatically captured and logged in step 608. Screenshots or image output (as required) and atomic representations of the output (JSON, xml, html, etc) may also be automatically captured and logged in step 610. In step 612, the output may be packaged and delivered back to validation module 620 for comparison against desired results and for generating a corresponding validation report/certificate.

With reference to FIG. 7, a regulated web-based application flow diagram 700 is shown. Step 702-step 714 show data flow between the local data processing system 622 and the remote data processing system/cloud 624. For the regulated web-based application, the automation agent 718 may include a headless browser 720 which may not have a graphical user interface. The headless browser 720/automated browser may provide automated control of the web application 716 via network communication or a command line interface. In step 702, the automation agent 718 may establish a secure channel with the validation module 620 for information transfer. Encryption keys may be exchanged in the process. Upon initiating a test/validation run, the startup parameters and test parameters may be pushed to the agent 718 in step 704. The agent 718 may launch the headless/automated browser to interact with the web application 716 and may begin executing, in step 706, the test script obtained from the test parameters. Textual/command output may be automatically captured and logged in step 708. Screenshots or image output (as required) may also be automatically captured and logged in step 710. In step 712, the output may be packaged and delivered back to validation module 620 for comparison against desired results/oracle and for generating a corresponding validation report/certificate.

Figure 8:
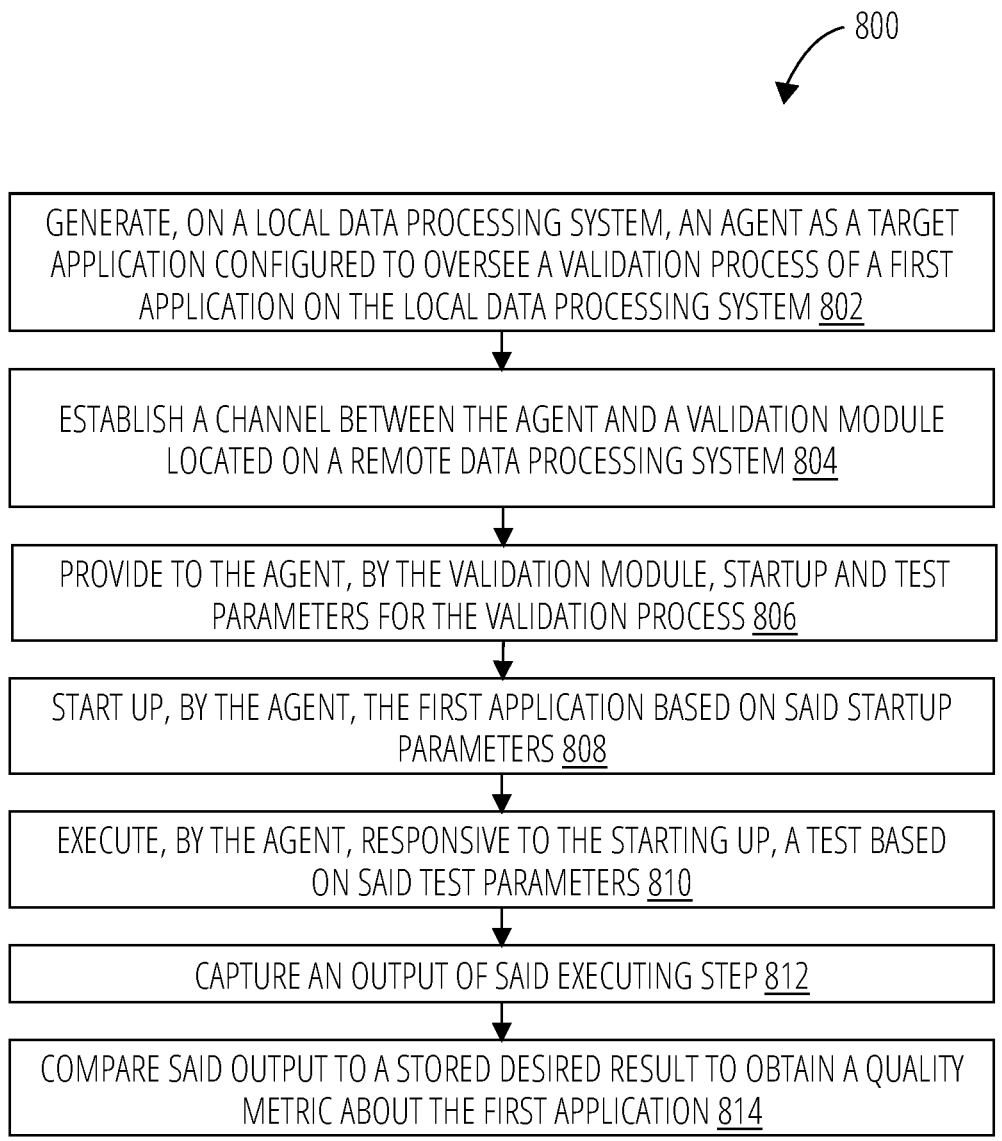
FIG. 8 depicts a validation process in which illustrative embodiments may be implemented.

Turning now to FIG. 8, a process 800 for validating a first application is shown. In step 802, process 800 generates, on a local data processing system, an agent as a target application configured to oversee a validation process of the first application on the local data processing system. In step 804, process 800 establishes a communication channel between the agent and a validation module located on a remote data processing system. In step 806, process 800 provides to the agent, by the validation module, startup and test parameters for the validation process. In step 808, process 800 starts up, by the agent, the first application based on the startup parameters. In step 810, process 800 executes, by the agent, responsive to the starting up, a predefined test based on the test parameters. In step 812, process 800 captures an output of the executing step. In step 814, process 800 compares the output to a stored desired result to obtain a quality metric about the first application. In process 800, the steps of providing (step 806), starting up (step 808), executing (step 810), capturing (step 812) and comparing (step 814) may be automatic.

Figure 9:
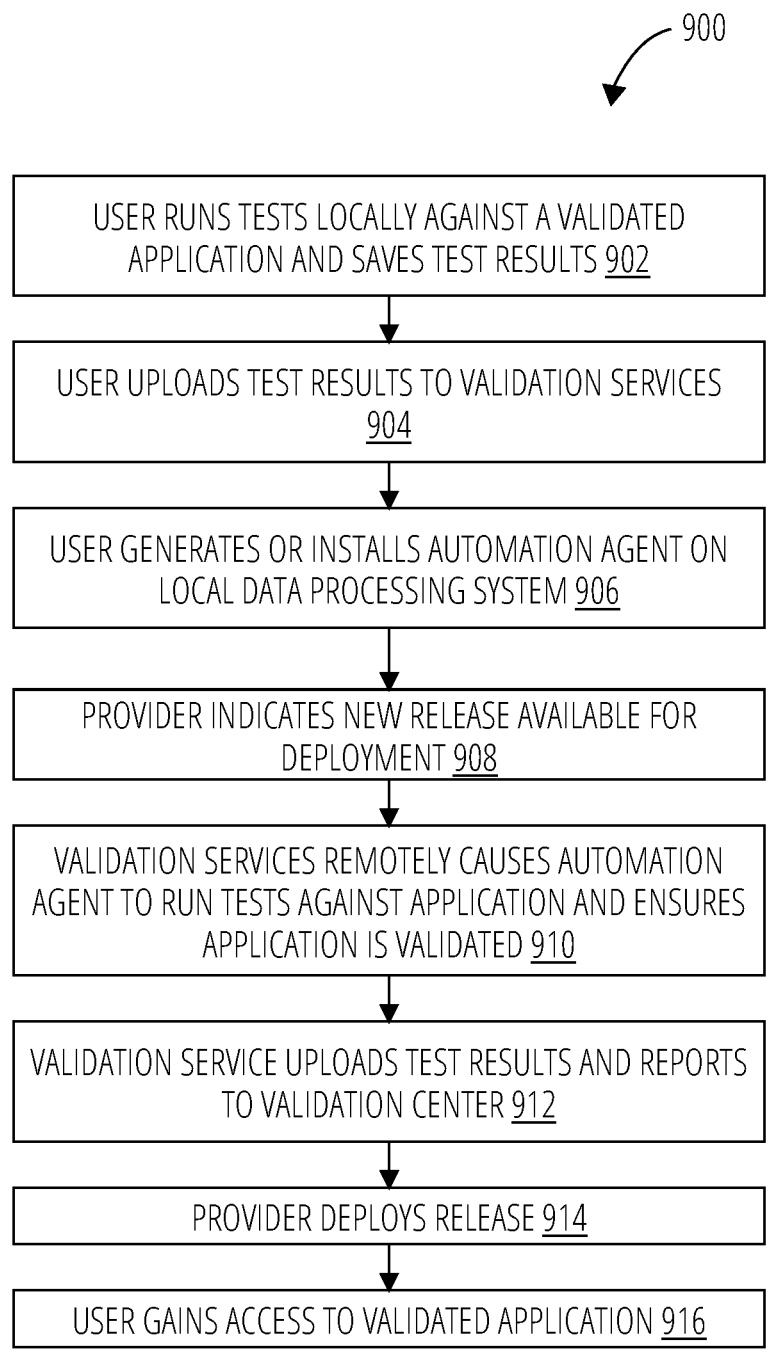
FIG. 9 depicts a validation process in which illustrative embodiments may be implemented.

FIG. 9 discloses a version control process 900 for an application provided by a provider for use by a user. The application may be used, for example, to perform process behavior analysis in a high throughput manufacturing location wherein the proportion of units in a sample of IV devices that do not conform to a fill weight range is monitored by the application. The version control process 900 may begin from step 902, wherein the user may initiate a test locally against a validated application and save test results as a reference. In step 904, the user may upload the obtained reference test results for use by a remote validation service provided by the software provider. In step 906, the user may generate or install an automation agent on a local data processing system. In step 908, the provider may indicate a new release of the application is available for deployment. In step 910, the validation services may remotely cause the automation agent to run tests against the downloaded and unvalidated new version of the application. In step 912, the validation service may provide test results and reports to a validation center configured to compare the test results to reference results. In step 914, the provider may deploy the new release to a corresponding ecosystem of machines, responsive to receiving a test pass indication. In step 916, the user may gain access to the validated new release and continue performing the process behavior analysis using said validated new release.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for validating applications and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of validating a first application comprising:
installing the first application on a regulated local data processing system of an actual user, the regulated local data processing system being a system in a regulated industry on which the actual user uses the first application at all times;
generating, on the regulated local data processing system of the actual user, an agent as a target application configured to oversee a validation process of the first application installed on the regulated local data processing system of the actual user;
establishing a channel between the agent and a validation module located on a remote data processing system, said channel being established for validating said first application;
providing to the agent, by the validation module, startup and test parameters for the validation process;
starting up, by the agent, the first application on the regulated local data processing system of the actual user based on said startup parameters;
executing, by the agent, responsive to the starting up, a predefined test based on said test parameters, the executing is performed on the regulated local data processing system of the actual user such that an output is generated and captured for the regulated local data processing system of the actual user;
and
comparing said output to a stored desired result to obtain a quality metric about the first application, the comparing comprises using a data comparison tool to automatically compute and display differences between a plurality of contents of the output and the stored desired result
wherein the method further comprises:
repeating a validation of the first application responsive to a repeat criterion being met, the repeating being responsive to receiving information about an update to the first application.

2. The method of claim 1, wherein the first application is a regulated desktop application located on the regulated local data processing system or a regulated web application hosted by the remote data processing system on the regulated local data processing system.

3. The method of claim 1, further comprising:
performing the comparing using the validation module in said remote data processing system.

4. The method of claim 1, wherein the repeating is automatic.

5. The method of claim 1, wherein the repeating is initiated by a user.

6. The method of claim 1, wherein the repeating is scheduled.

7. The method of claim 1, further comprising:
generating, by the validation module, a validation service on the remote data processing system to communicate with the agent via instructions transferred over a network from the remote data processing system.

8. The method of claim 7, wherein the validation service is configured to automatically control the agent.

9. The method of claim 1, wherein the output comprises one or more of graphical, statistical, and tabular data, along with associated atomic data.

10. The method of claim 1, wherein the output comprises a screenshot image.

11. The method of claim 10, wherein a textual representation of said screenshot image is obtained for comparison.

12. The method of claim 1, wherein the test parameters comprise a validation script.

13. The method of claim 1, wherein the test parameters comprise information about a regulatory process or regulated product.

14. The method of claim 1, wherein the providing, starting up, executing, capturing and comparing are automatic.

15. The method of claim 1, further comprising:
configuring the validation module to validate one or more other applications having different functionalities from said first application, on one or more other corresponding regulated local data processing systems.

16. The method of claim 1, configuring the validation module to validate said first application, on one or more other corresponding regulated local data processing systems,
wherein one or more environment dependent quality metrics about the first application obtained in the one or more other corresponding regulated local data processing system is compared with said quality metric of said regulated local data processing system.

17. The method of claim 1, wherein the stored desired result is representative of a desired performance of the first application.

18. A non-transitory computer readable storage medium storing program instructions which, when executed by a processor, causes the processor to perform a procedure comprising:
installing a first application on a regulated local data processing system of an actual user, the regulated local data processing system being a system in a regulated industry on which the actual user uses the first application at all times;
generating, on the regulated local data processing system of the actual user, an agent as a target application configured to oversee a validation process of the first application installed on the regulated local data processing system of the actual user;
establishing a channel between the agent and a validation module located on a remote data processing system, said channel being established for validating said first application;
providing to the agent, by the validation module, startup and test parameters for the validation process;
starting up, by the agent, the first application on the regulated local data processing system of the actual user based on said startup parameters;
executing, by the agent, responsive to the starting up, a predefined test based on said test parameters, the executing is performed on the regulated local data processing system of the actual user such that an output is generated and captured for the regulated local data processing system of the actual user;
and
comparing said output to a stored desired result to obtain a quality metric about the first application, the comparing comprises using a data comparison tool to automatically compute and display differences between a plurality of contents of the output and the stored desired result;
further comprising:

repeating a validation of the first application responsive to a repeat criterion being met, the repeating being responsive to receiving information about an update to the first application.

19. The non-transitory computer readable storage medium of claim 18, wherein the program instructions further cause the processor to repeat a validation of the first application responsive to a repeat criterion being met.

20. The non-transitory computer readable storage medium of claim 18, wherein the program instructions further cause computer usable code to be transferred over a network from the remote data processing system.

21. A computer system comprising:
at least one processor configured to:
install a first application on a regulated local data processing system of an actual user, the regulated local data processing system being a system in a regulated industry on which the actual user uses the first application at all times;
generate, on the regulated local data processing system of the actual user, an agent as a target application configured to oversee a validation process of the first application installed on the regulated local data processing system of the actual user;
establish a channel between the agent and a validation module located on a remote data processing system, said channel being established for validating said first application;
provide to the agent, by the validation module, startup and test parameters for the validation process;
start up, by the agent, the first application on the regulated local data processing system of the actual user based on said startup parameters;
execute, by the agent, responsive to the starting up, a predefined test on the regulated local data processing system of the actual user based on said test parameters, such that an output is generated and captured for the regulated local data processing system; and
compare said output to a stored desired result to obtain a quality metric about the first application, the comparing comprises using a data comparison tool to automatically compute and display differences between a plurality of contents of the output and the stored desired result;
further comprising:
repeating a validation of the first application responsive to a repeat criterion being met, the repeating being responsive to receiving information about an update to the first application.

22. The computer system of claim 21, wherein the at least one processor is further configured to repeat validating the first application responsive to a repeat criterion being met.

* * * * *